(12) United States Patent
Wang et al.

(10) Patent No.: US 8,588,135 B2
(45) Date of Patent: Nov. 19, 2013

(54) INTEGRATED SENSOR NETWORKS WITH OPTICAL AND WIRELESS LINKS

(75) Inventors: Chonggang Wang, Plainsboro, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 838 days.

(21) Appl. No.: 12/716,462

(22) Filed: Mar. 3, 2010

(65) Prior Publication Data

US 2010/0309844 A1 Dec. 9, 2010

Related U.S. Application Data

(60) Provisional application No. 61/183,742, filed on Jun. 3, 2009.

(51) Int. Cl.
*H04W 4/00* (2009.01)
*H04B 1/58* (2006.01)
*H04B 10/12* (2011.01)

(52) U.S. Cl.
USPC ........... 370/328; 370/329; 370/335; 370/352; 455/561; 398/115

(58) Field of Classification Search
USPC ................................................. 370/328–392
See application file for complete search history.

(56) References Cited

U.S. PATENT DOCUMENTS

| | | | |
|---|---|---|---|
| 6,671,819 B1 * | 12/2003 | Passman et al. | 714/4.1 |
| 6,735,630 B1 * | 5/2004 | Gelvin et al. | 709/224 |
| 6,826,607 B1 * | 11/2004 | Gelvin et al. | 709/224 |
| 6,832,251 B1 * | 12/2004 | Gelvin et al. | 709/224 |
| 6,930,596 B2 * | 8/2005 | Kulesz et al. | 340/506 |
| 7,020,701 B1 * | 3/2006 | Gelvin et al. | 709/224 |
| 7,251,570 B2 * | 7/2007 | Hancock et al. | 702/57 |
| 7,457,834 B2 * | 11/2008 | Jung et al. | 1/1 |
| 7,477,593 B2 * | 1/2009 | Scudder et al. | 370/217 |
| 7,483,387 B2 * | 1/2009 | Guichard et al. | 370/252 |
| 7,535,828 B2 * | 5/2009 | Raszuk et al. | 370/219 |
| 7,551,551 B2 * | 6/2009 | Filsfils et al. | 370/219 |
| 7,633,859 B2 * | 12/2009 | Filsfils et al. | 370/225 |
| 7,664,013 B2 * | 2/2010 | Filsfils et al. | 370/218 |
| 7,693,047 B2 * | 4/2010 | Guichard et al. | 370/217 |
| 7,869,345 B2 * | 1/2011 | Scudder et al. | 370/217 |
| 7,880,604 B2 * | 2/2011 | McKenna et al. | 340/506 |
| 7,961,600 B2 * | 6/2011 | Filsfils et al. | 370/218 |

(Continued)

OTHER PUBLICATIONS

Sivathasan, S. et al., "RF/FSO Wireless Sensor Networks: A Performance Study", IEEE Globecom 2008 Proceedings.

(Continued)

*Primary Examiner* — Phirin Sam
*Assistant Examiner* — Venkatesh Haliyur
(74) *Attorney, Agent, or Firm* — Joseph Kolodka; Bao Tran

(57) ABSTRACT

Systems and methods are disclosed for communicating data in an integrated sensor network having one or more nodes coupled to an optical sensor network and a radio frequency wireless sensor network, each node having an optical link and a wireless link. The method includes determining a transmission path having one or more hybrid hops for packet transmission over the optical sensor network and the radio frequency wireless sensor network, each hybrid hop including optical and wireless links between two neighboring nodes; and selecting a set of optical and wireless links for the optical sensor network and the radio frequency wireless sensor network to minimize contiguous wireless links.

20 Claims, 8 Drawing Sheets

(56) References Cited

U.S. PATENT DOCUMENTS

| | | | |
|---|---|---|---|
| 7,983,153 B2 * | 7/2011 | Filsfils et al. | 370/219 |
| 8,068,411 B2 * | 11/2011 | Vasseur et al. | 370/227 |
| 8,140,658 B1 * | 3/2012 | Gelvin et al. | 709/224 |
| 8,315,519 B2 * | 11/2012 | Wang et al. | 398/57 |
| 8,380,072 B2 * | 2/2013 | Wang et al. | 398/115 |
| 2006/0126496 A1 * | 6/2006 | Filsfils et al. | 370/216 |
| 2006/0140111 A1 * | 6/2006 | Vasseur et al. | 370/216 |
| 2006/0164975 A1 * | 7/2006 | Filsfils et al. | 370/225 |
| 2006/0193248 A1 * | 8/2006 | Filsfils et al. | 370/216 |
| 2006/0209682 A1 * | 9/2006 | Filsfils et al. | 370/219 |
| 2006/0221813 A1 * | 10/2006 | Scudder et al. | 370/216 |
| 2006/0262735 A1 * | 11/2006 | Guichard et al. | 370/254 |
| 2007/0121486 A1 * | 5/2007 | Guichard et al. | 370/216 |
| 2007/0150565 A1 * | 6/2007 | Ayyagari et al. | 709/223 |
| 2009/0147674 A1 * | 6/2009 | Scudder et al. | 370/225 |
| 2009/0245259 A1 * | 10/2009 | Filsfils et al. | 370/392 |
| 2010/0118732 A1 * | 5/2010 | Filsfils et al. | 370/252 |
| 2010/0201516 A1 * | 8/2010 | Gelvin et al. | 340/539.26 |
| 2010/0309844 A1 * | 12/2010 | Wang et al. | 370/328 |
| 2010/0310257 A1 * | 12/2010 | Wang et al. | 398/115 |
| 2010/0310258 A1 * | 12/2010 | Wang et al. | 398/115 |

OTHER PUBLICATIONS

Sivathasan, S et al., "Lifetime Comparison of RF-only and Hybrid RF/FSO Wireless Sensor Networks", Proceedings of the International Conference on Computer and Communication Engineering, May 13-15, 2008, Kuala Lumpur, Malayasia.

* cited by examiner

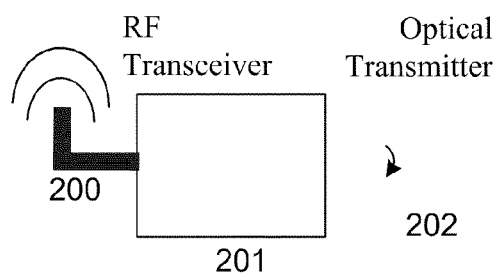
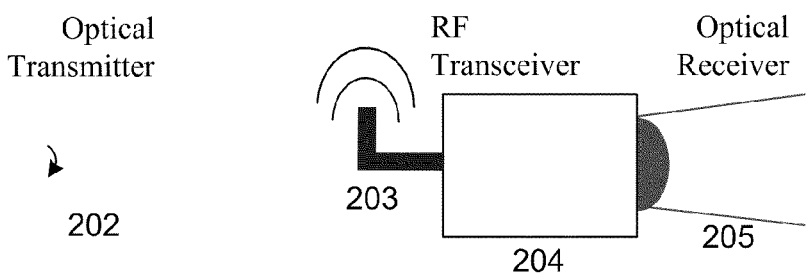
FIG. 2A  FIG. 2B
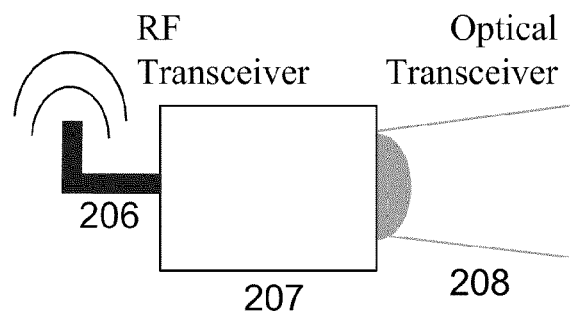
FIG. 2C

INTEGRATED SENSOR NETWORKS WITH OPTICAL AND WIRELESS LINKS

RELATED APPLICATIONS

This application claims the benefit of U.S. Provisional Application No. 61/183,742 filed on Jun. 3, 2009 and U.S. application Ser. No. 12/701,175 filed on Feb. 5, 2010, the contents of which are incorporated herein by reference.

BACKGROUND

With emerging realistic applications in various areas such as wireless healthcare and smart home, wireless sensor networks need to provide quality of service (QoS) in an energy-efficient way. A wireless sensor network (WSN) is generally composed of one or more sinks (or base stations) and tens or thousands of sensor nodes scattered in a physical space. Sensor nodes sense the physical information, process the sensed information, and report the processed information to the sink, which can query information and even control the behavior of the sensor nodes. WSNs can be used to monitor events and collect data in some special environments where other networks are difficult or costly to be deployed. Therefore, WSNs are usually event-oriented and data-centric, and have several distinctive features:

Unique Network Topology. The sensors nodes are usually organized into a multi-hop star-tree topology, which could be either flat or hierarchical. The sink sitting at the root of the tree plays the role of information collection and relaying to exterior networks. The topology of a WSN can be highly variable and dynamic due to node mobility and the depletion of energy.

Diverse Applications. A WSN can be used to support diverse applications ranging from habitat monitoring and target tracking to security surveillance and so forth [1]. These applications may be interested in different sensory data and therefore have different requirements on quality of service (QoS) and reliability.

Traffic Characteristics. In a WSN, traffic usually flows upstream from the sensor nodes to the sink although the sink may occasionally generate certain downstream traffic for the purpose of control and management. The traffic models of different applications can be classified into four types: event-driven delivery, continuous delivery, query-driven delivery, and hybrid delivery. For example, in event-driven delivery, the sensor nodes start event reporting only if the target events (e.g., the temperature is below zero) have been sensed.

Resource Constraints. Despite diverse commercially available sensor products [2], sensor nodes usually have limited resources, including low computation capability, small memory size, low communication bandwidth, and finite and un-rechargeable battery. The limitation of resources narrows the designing space of various protocols and algorithms for WSNs.

Small Message Size. Messages in WSNs usually have a small size compared with those in other networks. For this reason, there is usually no concept of segmentation in most applications of WSNs.

The performance of a wireless sensor network can be evaluated based on different metrics such as QoS and energy-efficiency. Different applications might have different requirements on these performance metrics.

One requirement is energy-efficiency. A sensor node usually has limited energy. For this reason, it is most important for a transport protocol to keep high energy-efficiency in order to prolong the network lifetime. Due to bit errors and/or congestion, packet loss is common in a WSN. For loss-sensitive applications packet loss leads to retransmission and inevitably consumes additional energy. Therefore, packet loss is a primary factor that affects energy-efficiency at the transport layer.

Another requirement is reliability. For different applications, different levels of reliability may be required. According to the sensitivity of an application to packet loss, two types of reliability can be classified: packet reliability and event reliability. Packet reliability means that the application is very loss-sensitive and requires the successful transmission of each packet. One example of such applications is downstream code distribution or queries. Event reliability stands for the requirement of loss-tolerant applications that allow certain packet loss. For example, the sensor nodes with digital camera can be used to send images to the sink. Since images are somewhat loss-tolerant, the sink does not need to correctly receive every packet, but only a certain percentage of packets.

Yet another requirement is QoS. Sensor nodes can be used to transmit continuous images for target tracking. In this scenario, the sensor nodes generate high-speed data flows and require larger bandwidth than event-based applications. For some delay-sensitive applications, such as commands to task sensor nodes, a network must guarantee real-time data transmission. As mentioned before, some applications are loss-sensitive and cannot stand packet loss or require a very small packet loss ratio. Therefore, a transport protocol may need to support traditional QoS in terms of throughput, packet delivery latency, and packet loss ratio. The difference is that in a WSN these QoS metrics should be guaranteed in a highly energy-efficient way.

Fairness is another requirement. Sensor nodes are usually scattered in a geographical area to collect information. Due to the many-to-one convergent nature of upstream traffic, it is much more difficult for the sensor nodes far away from the sink to successfully transmit their sensory data to the sink. In order to let the sink have full information on the entire sensed area, a transport protocol should provide fair bandwidth allocation among all sensor nodes so that the sink can get the same number of packets from each sensor node during a period of time.

These distinctive features of WSNs and new performance metrics pose significant challenges on the design of a WSN that can meet application requirements and operate as long as possible. Usually, the QoS of an application and the lifetime of a network are contradictory to each other.

SUMMARY

In one aspect, a network includes an optical sensor network; and a radio frequency (RF) wireless sensor network coupled to the optical sensor network, wherein the optical sensor network and the RF wireless sensor network communications are coordinated over both optical and wireless links.

Implementations of the above aspect may include one or more of the following. Each network can have a plurality of nodes, wherein the nodes form an ad hoc topology including tree, linear, or mesh topology. The nodes can include an RF transceiver and an optical transmitter. The nodes can include an RF transceiver and an optical receiver. Alternatively, the nodes can include an RF transceiver and an optical transceiver. The one or more nodes communicate with quality-aware cross-link optimization. The one or more nodes can transmit a packet over a wireless link and an optical link to utilize link diversity to improve transmission performance.

The packet can be transmitted even when one link has bad quality and another one has good quality. The nodes can automatically switch to a good link if a bad link is detected. The node in the network can exploit the optical link by avoiding two contiguous wireless links along a transmission path. In one embodiment, the system uses an optimal link selection that exploits the benefits of the optical link. The optimal link selection process avoids two contiguous wireless links along the transmission path as much as possible, because the contiguous wireless links may cause radio collision and decrease the performance.

In another aspect, a method for communicating data in an integrated sensor network having one or more nodes coupled to an optical sensor network and a radio frequency wireless sensor network, each node having an optical link and a wireless link. The method includes coordinating transmissions over the optical sensor network and the RF wireless sensor network with quality-aware cross-link optimization; transmitting a packet over both wireless and optical links to improve performance through link diversity; and automatically switching to a good link if a bad link is detected.

Implementations of the above aspect may include one or more of the following. The method includes forming an ad hoc topology including tree, linear, or mesh topology with the nodes. The node can include include an RF transceiver and an optical transmitter, an RF transceiver and an optical receiver, or an RF transceiver and an optical transceiver. The method can include determining a transmission path between nodes that minimizes contiguous wireless links. The method can select a path based on optical and wireless link availability and quality information. The packet can be transmitted over both an optical media access control (MAC) and a wireless MAC.

In another aspect, a method for communicating data in an integrated sensor network having one or more nodes coupled to an optical sensor network and a radio frequency wireless sensor network, each node having an optical link and a wireless link. The method includes determining a transmission path having one or more hybrid hops for packet transmission over the optical sensor network and the radio frequency wireless sensor network, each hybrid hop including optical and wireless links between two neighboring nodes; and selecting a set of optical and wireless links for the optical sensor network and the radio frequency wireless sensor network to minimize contiguous wireless links.

Implementations of the above aspect may include one or more of the following. The method uses only optical transmission for a pure optical hop and uses only wireless transmission a pure wireless hop. Either the optical link or the wireless link can be used for packet transmission if a hop is the only hop from a source to a destination. The method can select the optical link if a prior hop uses the wireless link. The optical link can be selected if a succeeding hop uses the wireless link. The method can select either the wireless link or the optical link if neither a prior hop nor a succeeding hop uses the wireless link. The optical link can be selected if a prior hop uses the optical link and a succeeding hop is a hybrid hop. The method can check if a prior or succeeding hop is a hybrid hop if the transmission link of a hybrid hop changes. The method can reselect a link when a hybrid hop changes its transmission link from an optical link to a wireless link. The method can also reselect a link when a hybrid hop changes its transmission link from the wireless link to the optical link. The link can be reselected due to link unavailability and a prior hop or a succeeding hop is a hybrid hop. The method can recursively reselect a link for the prior or succeeding hop if they are hybrid hops. The method can include coordinating transmissions over the optical sensor network and the radio frequency wireless sensor network with a quality-aware cross-link optimization; transmitting a packet over both wireless and optical links to improve performance through link diversity; and automatically switching to a good link if a bad link is detected. An ad hoc topology including tree, linear, or mesh topology with the nodes can be formed. The method can communicate with a node having an RF transceiver and an optical transmitter, a node having an RF transceiver and an optical receiver, or a node having an RF transceiver and an optical transceiver. The method can determine a transmission path between nodes to minimize contiguous wireless links. The method can select a path based on optical and wireless link availability and quality information. The method includes determining a weighted path length, an average optical hops, and a remaining bandwidth determination. Link quality can be determined. The method includes selecting candidates with a remaining bandwidth determination and selecting a path with a maximum average optical hop count. The method includes transmitting the packet over both an optical media access control (MAC) and a wireless MAC.

Advantages of the preferred embodiments may include one or more of the following. The sensor network architecture includes integrated sensor networks with optical and wireless links to improve QoS and energy-efficiency by utilizing the complementary and diverse features of optical and wireless links. The system and method achieve high QoS and energy-efficiency in wireless sensor networks.

BRIEF DESCRIPTION OF THE DRAWINGS

FIG. 1A illustrates an exemplary hybrid communication system in accordance with an embodiment of the invention, while

FIGS. 2A-2C show exemplary communication nodes in FIGS. 1A-1B;

DESCRIPTION

The system and protocols described herein provide improved network connectivity and reliability of sensor networks, improved system overall throughput, higher energy-efficiency due to the use of low power-consuming optical transmission and resulting lower number of RF transmissions, thus providing a high quality of service in terms of data transmission delay.

Figure 1A:
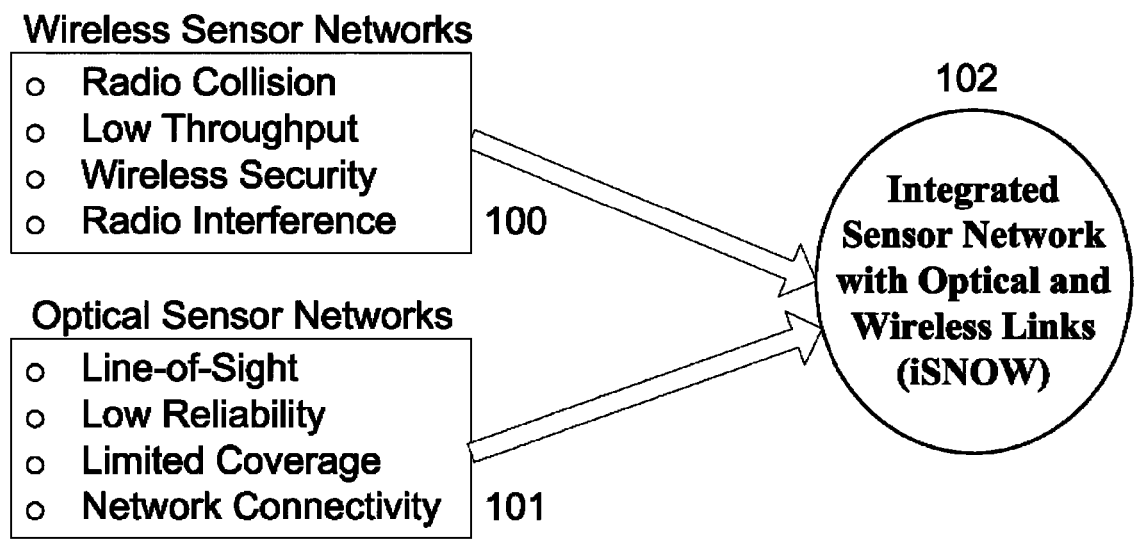
Figure 1B:
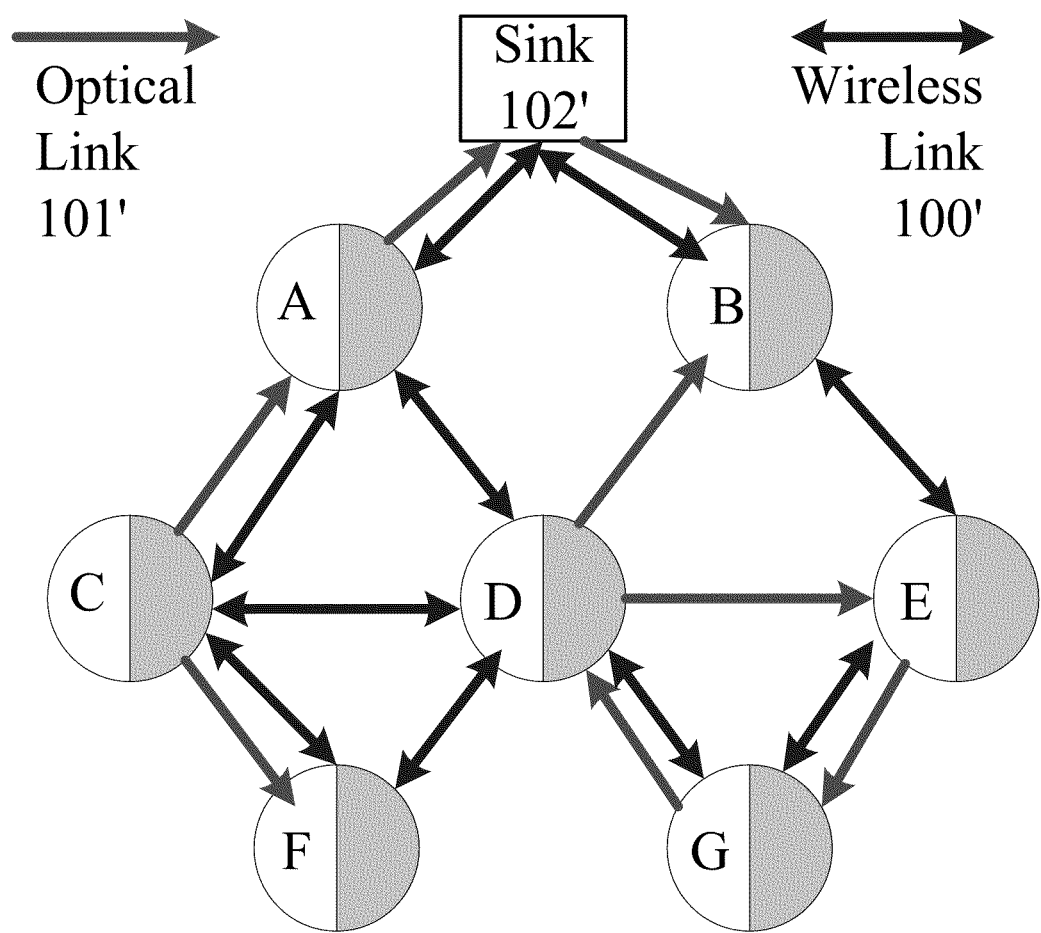
FIG. 1B shows a corresponding network topology of the hybrid communication system.

FIG. 1A shows an example of a hybrid free-space optical/radio-frequency (FSO/RF) communication system 102 where a wireless sensor network 100 is used in combination with an optical network 101. FIG. 1B shows a corresponding network topology of the hybrid communication system with a sink 102' receiving wireless links 100' and optical links 101'. The sink 102' in turn coordinates communication with a plurality of nodes A-G.

In one embodiment, the nodes of the communication system 102 form a mesh network, which is a type of networking wherein each node in the network may act as an independent router, regardless of whether it is connected to another network or not. It allows for continuous connections and reconfiguration around broken or blocked paths by "hopping" from node to node until the destination is reached.

In one embodiment, the wireless link 100' uses omnidirectional antenna and is able to cover all directions within its transmission coverage. The free space optical link 101' such as Light-Emitting Diode (LED) and Infrared (IR) has directional property and its transmission can only be received within the arrival angle.

Individually, the wireless sensor network 100 and optical sensor network 101 have strengths and weaknesses relating to overall performance, quality of service, and reliability, among others. For example, the optical network 101 uses visible light communication (VLC) with access free spectrum—VLC works at 400 nm to 70 nm wavelengths without any regulatory issue. In contrast, the available of RF spectrum is regulated and limited. Further, there is no Electromagnetic Interference (EMI) in VLC. VLC demands line of sight (LOS) or directional transmission, and LOS can provide better security than the broadcast transmission in RF. Additionally, the LOS transmission naturally enables good space multiplexing. Visible light cause no harm to eyes and human being's health. However, electromagnetic radiation in RF is harmful. Additionally, VLC has limited mobility capability due to LOS issues.

The system 102 seamlessly and jointly integrates "wireless optical" nodes and "wireless/RF" nodes. Every sensor node has two coordinated links—optical link 101' and wireless/RF link 100'. In one implementation, the optical link 101' is unidirectional. The complementary and diverse features of optical and wireless links 101 and 100 are leveraged to improve quality of service (QoS) and energy-efficiency. The system achieves high QoS and energy-efficiency in wireless sensor networks.

The system of FIG. 1A enables cross-link (optical link and wireless link) optimization. As described in more details below, the dynamic routing process takes "the number of optical links" and "the number of wireless/RF links" into consideration for path selection. Additionally, a MAC coordination process considers "optical link availability" and "wireless/RF link availability" at neighboring nodes.

FIGS. 2A-2C show exemplary components or nodes of the integrated sensor network 102, in accordance with an embodiment of the invention. A first type of node, illustrated in FIG. 2A, contains an RF transceiver 201 with an antenna 200, and an optical transmitter 202 with an optical transmission angle α. A second type of node, illustrated in FIG. 2B, contains an RF transceiver 204 with an antenna 203, and an optical receiver 205. A third type of node, illustrated in FIG. 2C, contains an RF transceiver 207 with an antenna 206 and an optical transceiver 208. Any number of the first, second type, and third types of nodes may be included in communication system 100. The RF components in the nodes may use 802.15.4 technology, low-power 802.X technology, and/or other relevant RF air-interface technology. The optical components in the nodes may use wireless optical technology, such as VLC and/or infrared. Communication system 102 may include other types of nodes.

The RF components in nodes 201, 204 and 207 communicate with other RF components in other nodes, and the optical components in each node communicate with other optical components in other nodes. For example, the RF transceiver in node 201 may communicate with an RF transceiver in node 207, and an optical transmitter in node 204 may communicate with an optical transceiver in node 207. In addition, the RF components and optical components in a node may communicate with users.

Nodes 201, 204 or 207 may be constructed as a linear, tree, or ad hoc network. In accordance with embodiments of the invention, a routing protocol described herein may be used. A media access control (MAC) coordination algorithm described herein may be used to schedule links and determine when to use which link at every sensor node.

The system of FIGS. 1A, 1B and 2 jointly exploits complementary features of wireless/RF and optical networks 100 and 101. The combined system of FIG. 1 has improved reliability, better coverage, high energy-efficiency, better security, improved performance, and better service provision, among others.

Figure 3:
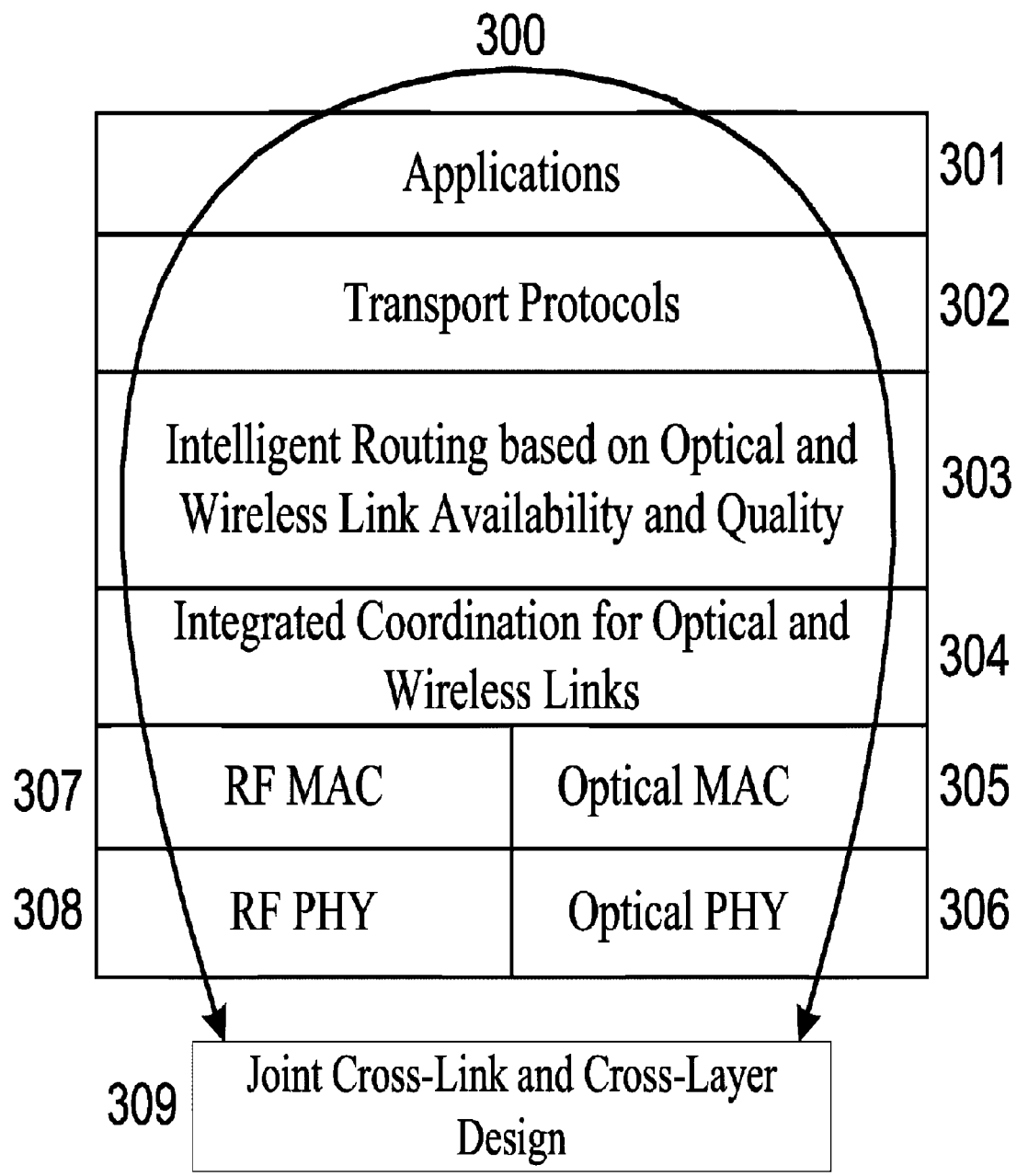
FIG. 3 is a schematic diagram of a protocol stack, in accordance with an embodiment of the invention.

In accordance with an embodiment of the invention, communications in the system 102 utilize an improved protocol described herein. FIG. 3 is a schematic diagram of a protocol stack 300, in accordance with an embodiment of the invention. Layer 301 is where applications reside. Layer 302 is the transport protocols. Layer 303 supports intelligent routing based on optical and wireless link availability and quality. Layer 304 specifies integrated coordination for optical and wireless links. Layer 305 is the optical medium access control (MAC). Layer 306 is the optical physical (PHY). Layer 307 is the RF MAC, while layer 308 is the RF PHY. Layer 309 specifies joint cross-link and cross-layer design.

The protocol stack 300 handles two sets of physical (PHY) and medium access control (MAC) protocols for wireless link 100' and optical link 101', respectively. The architecture of FIG. 3 enables link coordination and cross-layer optimization. If one link is not available, the node can automatically switch to another link. If both links are available, the node can transmit packets over one of them or over both concurrently to exploit channel diversity and improve throughput.

In embodiments of the invention, one or more routing processes that select a path based on optical and wireless link availability and quality information are used to transmit signals in communication system 102. The processes described herein are different from the traditional "shortest path first" strategy, which is commonly used. In some embodiments, coordinator 304 between routing layer 303 and MAC layer 305/307 may coordinate data transmission over RF and optical links. The system and protocols described herein enable quality-aware cross-link optimization between optical links and wireless links.

In accordance with embodiments of the invention, when a node has both an optical link and a wireless link to its next neighboring node, and is allowed to use either link, it uses the following quality-aware cross-link optimization: it transmits each single packet currently over both the wireless link and the optical link to utilize link diversity to improve the performance. If one link is not available, the node can automatically switch to another link.

In accordance with an embodiment of the invention, a process is used to select an optimal path within communication system 102 to use to route data signals from a source sensor node to a sink base based on optical and wireless link availability and quality. The process identifies three kinds of links in communication system 102—pure optical links, pure wireless links, and hybrid optical wireless links. If there is only an optical link existing between two neighboring nodes, the link is deemed a pure optical link. If there is only a wireless link existing between two neighboring nodes, the link is deemed a pure wireless link. If both an optical link and a wireless link exist between two neighboring nodes, the link is deemed a hybrid optical wireless link.

The process identifies available paths from a source sensor to a sink by identifying available combinations of one or more communication links between the source sensor and the sink. The algorithm attempts to select the path with the fewest number of links, with more optical links, and/or the fewest number of active neighboring nodes. A path having fewer links requires fewer transmissions and may be more energy-efficient. A path having more optical links may be desirable as it implies more opportunities to send data over optical links rather than radio links, reducing the risk of radio collisions and reducing potential radio interference. More optical links may also improve throughput and be more energy-efficient as well. A path having fewer active neighboring nodes may be desirable as it may avoid potential congestion and increase overall system throughput.

Figure 4:
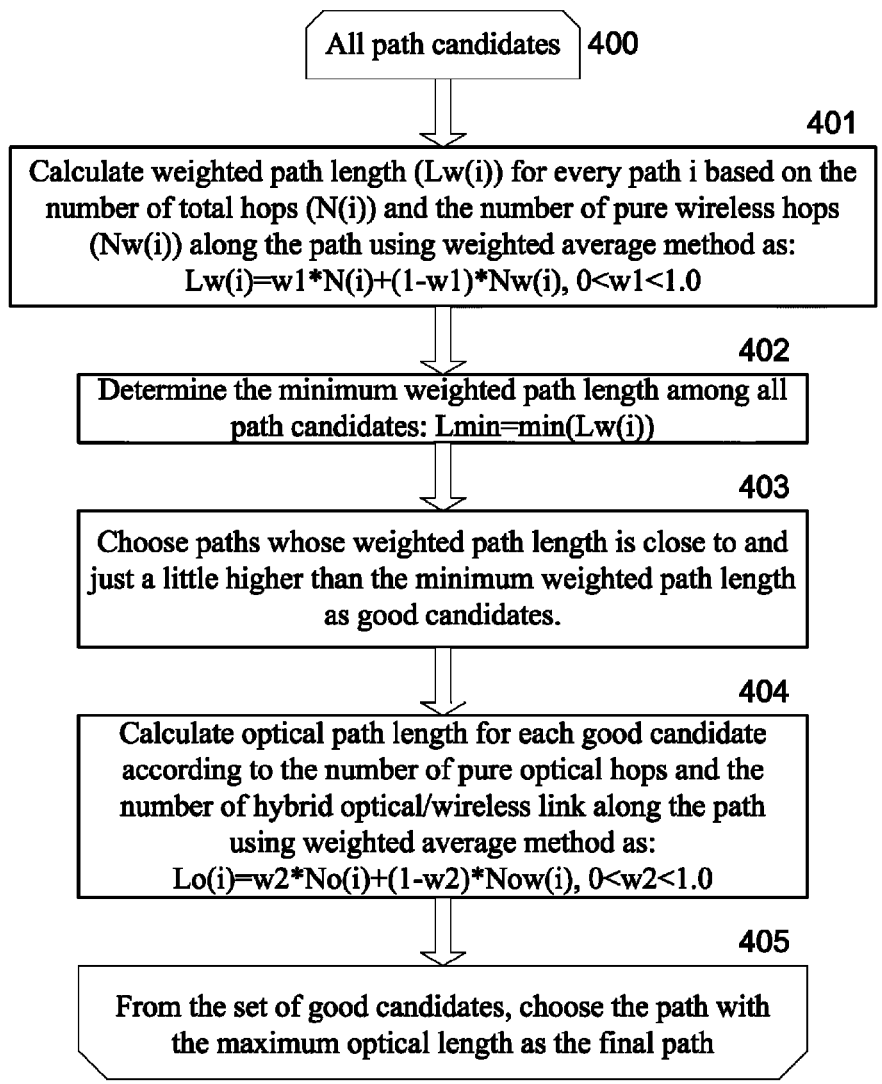
FIG. 4 is a flowchart depicting an exemplary method to transmit information in a communication system, in accordance with an embodiment of the invention.

FIG. 4 is a flowchart depicting a method to transmit information in communication system 100, in accordance with an embodiment of the invention. In one embodiment, the routing scheme determines the best path from the source sensor node to the sink based on optical and wireless link availability and quality. There are three kinds of links/hops: 1) pure optical link/hop—if there is only optical link existing between two neighboring nodes, this link is called as pure optical link; 2) pure wireless link/hop—if there is only wireless link existing between two neighboring nodes, this link is called as pure wireless link; 3) Hybrid optical wireless link/hop—if there is both optical and wireless link between two neighboring nodes, this link is called as hybrid optical wireless link. The method chooses the path with the least number of hops, with more optical links, and/or less number of active neighboring nodes. Fewer hops means fewer transmissions, which means that the system is energy-efficient. Favoring optical links imply more opportunities to send data over optical links rather than radio links, which reduces radio collisions and mitigates radio interference and in turn improves throughput and energy-efficiency as well. Fewer active neighboring nodes is useful for avoiding potential congestion and increasing overall system throughput.

Turning now to FIG. 4, at 400, all path candidates in communication system 100 are identified. In one embodiment, each path i consists of N(i) transmitting nodes including the source node and intermediate nodes and N(i) links accordingly. Each link may be a pure optical link, a pure wireless link, or a hybrid optical wireless link. For each path i, No(i) is the number of pure optical links along the path, Nw(i) is the number of pure wireless links along the path, and Now(i) is the number of hybrid optical and wireless links along the path. In this embodiment, $N(i)=No(i)+Nw(i)+Now(i)$.

At 401, for every path i, a weighted path length Lw(i) is calculated based on the Total Number of Links in the Path, N(i), and the Number of Pure Wireless Links Nw(i) in the Path. In the exemplary embodiment, $Lw(i)=w1*N(i)+(1-w1)*Nw(i)$. In the exemplary embodiment, w1 is a design parameter having a value between 0 and 1.0.

At 402, a minimum weighted path length among all paths $(Lmin=min(Lw(i)))$ is determined. At 403, paths having a weighted path length less than a selected value are selected as good candidates. For example, paths whose weighted path length Lw(i) are smaller than "$min(Lw(i))*(l+k)$" may be selected as good candidates, where k is another design parameter. In one example, k is less than 1.0. In another embodiment, paths having a weighted path length that differs from the minimum weighted path length by less than a predetermined amount are selected as good candidates.

At 404, for each good candidate selected at 403, an optical path length is calculated based on the number of pure optical links No(i) and the number of hybrid optical/wireless links. In one example, $Now(i): Lo(i)=w2*No(i)+(1-w2)*Now(i)$, where w2 is a design parameter between 0 and 1.0.

At 405, the path having the highest optical path length Lo(i) is selected from among the set of good candidates as the final path. Information, such as a signal, is transmitted via the final path.

In another embodiment of the invention, a routing algorithm that considers link quality is used to transmit signals in communication system 102. This process may be used, for example for data flows that need a certain bandwidth. First, a remaining bandwidth (Br(i,j)) is calculated for each link j along a path i, based on the total effective bandwidth (Be(i,j)) on the same link. For a pure optical link, a total effective bandwidth Be(i,j) is determined by the link quality. For a pure wireless link, a total effective bandwidth Be(i,j) is dependent on both link quality and the number of neighboring radio nodes, since more neighboring nodes results in more MAC layer overhead and radio collisions and lower effective bandwidth. Existing theoretical results can be utilized to capture this effect. For a hybrid optical and wireless link, Be(i,j) is calculated by adding the effective bandwidth of the optical link and that of the wireless link. Once Be(i,j) is obtained, Br(i,j) is calculated as $Br(i, j)=Be(i, j)\Sigma R(i,-j, f)$, where Nf(i, j) is the number of flows and R(i,j,f) is the data rate of flow f on the link j along the path i. Then, paths whose remaining bandwidth is higher than the bandwidth the flow is requesting are selected as qualified candidates. Finally, the qualified candidates are analyzed using the method described in FIG. 4 to determine the final path. Information, such as a signal, is transmitted via the final path.

Figure 5:
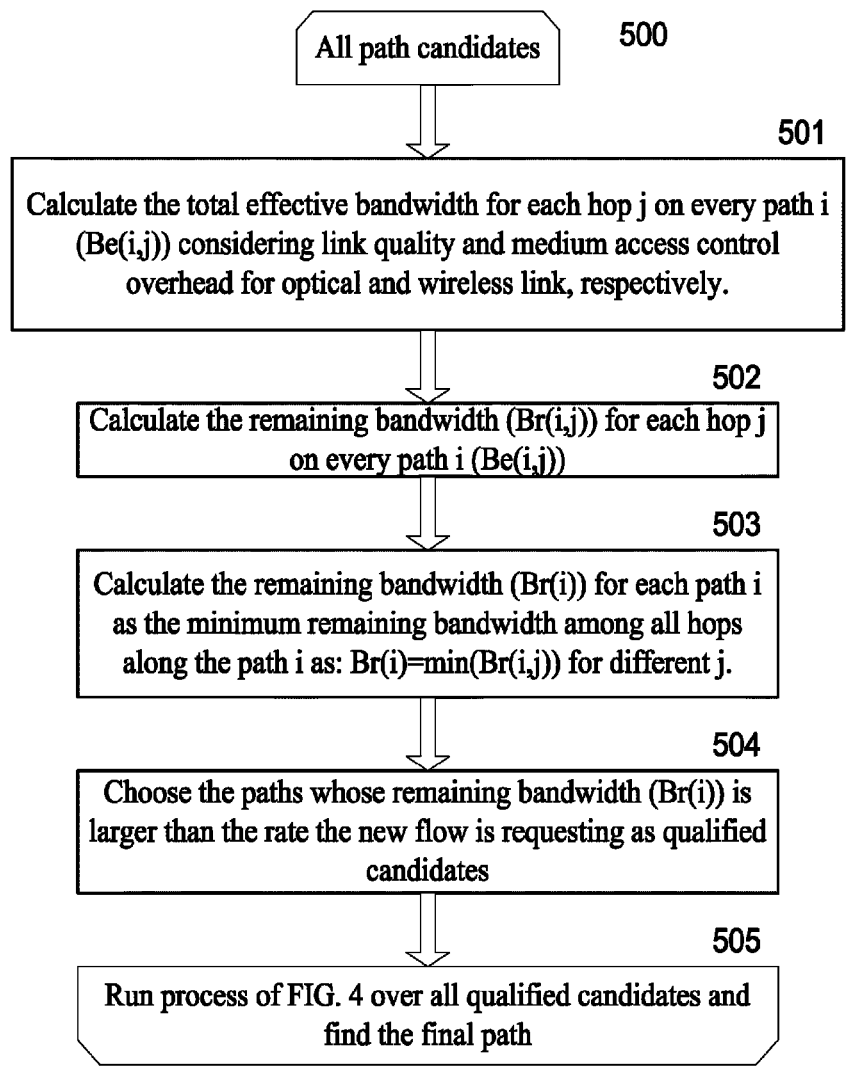
FIG. 5 is a flowchart depicting another method to transmit information in a communication system, in accordance with an embodiment of the invention.

FIG. 5 is a flowchart depicting a method to transmit information in communication system 102, in accordance with an embodiment of the invention. At 500, all path candidates are identified. At step 501, for each path i, the following is performed: for each link j on the respective path i, the Total Effective Bandwidth Be(i,j) is calculated based on link quality and Medium Access Control overhead for optical and wireless links, respectively. At 502, for each path i, the following is performed: for each link j on the respective path i, the remaining bandwidth Br(i,j) is calculated based on Be(i,j). In one example, $Br(i, j)=Be(i, j)\Sigma R(i,-j, f)$, as discussed above. At 503, for each path i, the remaining bandwidth Br(i) is calculated as the minimum remaining bandwidth among all links in path i: $Br(i)=min(Br(i,j))$ for different j. At 504, all paths having a remaining bandwidth Br(i) larger than the rate requested by the new data flow are selected as Qualified Candidates. A final path is determined based on characteristics of the paths in the set of Qualified Candidates. In the exemplary embodiment, at 505, the selection method described in FIG. 4 is applied to the set of Qualified Candidates (as selected at 504) to selected a final path. In other embodiments, a final path may be determined based on characteristics of the paths in the set of Qualified Candidates using other selection methods. Information, such as a signal, is transmitted via the final path.

Figure 6:
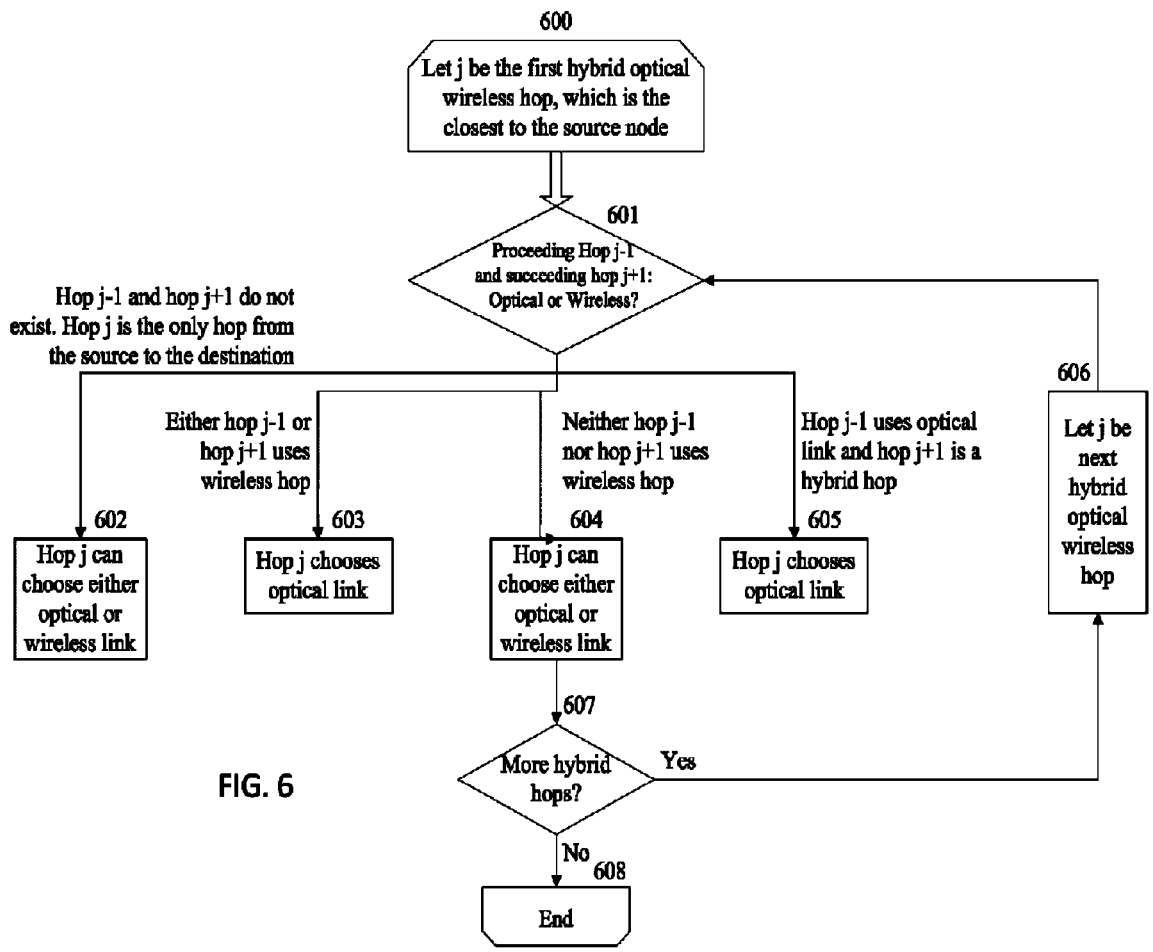
FIG. 6 shows an exemplary process for selecting links for communication using the system of FIG. 1.

FIG. 6 shows an exemplary process for selecting links for communication using the system of FIG. 1. MAC coordination is actually related to dynamic link selection because a sensor node might have two links (optical and wireless) at the same time. Potential options for dynamic link selection are as follows: 1) optical link for control message and wireless link for data; 2) optical link for forward transmission and wireless for backward transmission; 3) optical link for the situation with highly potential radio interference and collision; 4) optical link for the situation where FEC rather than re-transmission can meet application requirements; 5) concurrent and interleaved data transmission over both optical and wireless link.

The MAC coordination in the embodiment of FIG. 6 is described next. After the path is selected, each hop will use either optical or wireless/radio for packet transmission. Pure optical hops use optical transmission and pure wireless hops use wireless transmission. For hybrid optical/wireless hops, there are three choices: 1) use optical transmission only; 2) use wireless transmission only; 3) use both optical and wireless transmissions. In FIG. 6, a dynamic link selection is designed for hybrid optical wireless hop to determine which link will be chosen. In one embodiment with m hybrid hops (j1<j2< . . . <jm) along the path i. At 600, the system selects a first hybrid optical wireless hop node j. This can be done using the process of FIG. 5. At 601, the process checks if the preceding hop (j−1) or the succeeding hop (j+1) of the hybrid hop (j) uses optical or wireless links.

With the availability of optical link and wireless link at each node, there are four possibilities. At 602, if the hybrid hop j is the only hop from the source to the destination, it can use either optical or wireless link. At 603, if the proceeding hop (j−1) of the hybrid hop j uses wireless link or the succeeding hop (j+1) of the hybrid hop j uses wireless link, the hybrid hop j choose to use optical link. At 604, if neither the proceeding hop (j−1) nor the succeeding hop (j+1) of the hybrid hop (j) uses wireless link, the hybrid hop choose to use either wireless link or optical link. Alternatively, at 605, if the proceeding hop (j−1) uses optical link and the succeeding hop (j+1) is a hybrid hop too, the hybrid hop j selects an optical hop. From 602-605, the process checks at 607 for remaining hybrid hops. If not, the process exits, and if remaining hops exist, the process selects the next hybrid optical wireless hop at 606 and loops back to 601 to process the next hop.

The system uses a link reselection mechanism, which is triggered whenever a hybrid hop changes its transmission link (from optical to wireless or vice versa) due to link unavailability and its proceeding or succeeding hop is a hybrid hop as well. For example, if the transmission link of hybrid hop j is changed, the system checks if a proceeding or succeeding hop is a hybrid hop. If either (hop j−1 or j+1) is indeed a hybrid hop, the system reselects transmission link for the hop (j−1 or j+1) that is a hybrid one according to the rules listed in FIG. 5 and recursively reselects link for their proceeding or succeeding hop if they are also hybrid hops.

In one example, if P is all path candidates from a sensor node of interest to the sink 102'. In this example, each path i(∈P) consists of N(i) sensor nodes including the source node and N(i) hops accordingly. In this example, $H_i$={1, 2, . . . , N(i)} represents the set of all hops along the path i accordingly. Each hop j∈$H_i$ could be a pure optical hop, a pure wireless hop, or a Hybrid Optical/Wireless Hop if there is both optical and wireless link between two neighboring nodes.

In this system, $N_o(i)$ as the number of pure optical hops along the path i, $N_w(i)$ as the number of pure wireless hops along the path i, and $N_{ow}(i)$ as the number of hybrid optical and wireless hops along the path i, and $N(i)=N_o+N_w+N_{ow}(i)$. In order to determine the best path, the system calculates three parameters for each path i:

Weighted Path Length ($L_w(i)$)—it is defined as the weighted average value of the number of pure wireless hops $N_w(i)$ and the number of total hop N(i) and calculated as:

$$L_w(i)=w1*N(i)+(1-w1)*N_w(i), \quad (1)$$

where w1 is a design parameter with a value between 0 and 1.0. The shorter path length and/or the smaller number of pure wireless hops, the smaller weighted path length is resulted.

Average Optical Hops ($L_o(i)$)—it is defined as the weighted average value of the number of pure optical hops and the number of hybrid hops:

$$L_o(i)=w2*N_o(i)+(1-w1)*N_{ow}(i), \quad (2)$$

where w2 is a design parameter between 0 and 1.0. As we can see, the higher number of pure optical hops or hybrid hops means the larger average optical hops.

Remaining Bandwidth ($B_{min}(i)$)—it is defined as the minimum remaining bandwidth of each hop j along the path i, i.e.

$$B_{min}(i)=\min_{j\in H_i} B_r(i,j) \quad (3)$$

where $B_r(i, j)$ is the remaining bandwidth for each hop j∈$H_i$ along the path i and calculated as:

$$B_r(i,j)=B_e(i,j)-\Sigma_{f\in F_{i,j}} R(i,j,f), \quad (4)$$

where $F_{i,j}$ is the set of all flows that travels through the hop j of the path i and R(i,j, f) is the data rate of a flow f∈$F_{i,j}$. $B_e(i,j)$ is the effective bandwidth of the hop j∈$H_i$ of the path i. For pure optical hop, $B_e(i,j)$ is determined by the optical link quality. For pure wireless hop, $B_e(i,j)$ is dependent on both link quality and the number of neighboring radio nodes since the more neighboring nodes, the more MAC layer overhead and signal collisions due to simultaneous transmissions and lower effective bandwidth will be resulted. Existing theoretical results or online measurement can be utilized to capture this effect and calculate $B_e(i,j)$ for pure wireless hop. For hybrid optical and wireless hop, $B_e(i,j)$ will be the addition of the effective bandwidth of optical link and wireless link.

The link quality is taken into consideration for choosing the best path for flows that need certain bandwidth. Suppose the bandwidth that a flow f requests is R(f). It works as follows:

Step 1: Select Qualified Candidates. From the set of all path candidates P, choose the qualified candidates that have remaining bandwidth ($B_{min}(i)$) larger than R(f). $B_{min}(i)$ is calculated according to Eq. 4. Denote the set of qualified candidates as $P_q$={i|i∈P, $B_{min}(i)$≥R(f)}.

Step 2: Select Good Candidates. From the set of qualified candidates $P_q$, choose paths that have weighted path length close to the minimum weighted path length as good candidates $P_g$, or denoted as $P_g$={i|i∈$P_q$, $L_w(i)$<min($L_w(i)$)*(1+k)}, where 0<k<1.0 is a control parameter.

Step 3: Select the Best Path. From the good path candidate set $P_g$, choose the path with the maximum average optical hops as the final path p or p=arg $\max_{i\in P_g} L_o(i)$. If there are multiple paths tied with the same maximum average optical hops, the system randomly chooses one of them.

Figure 7:
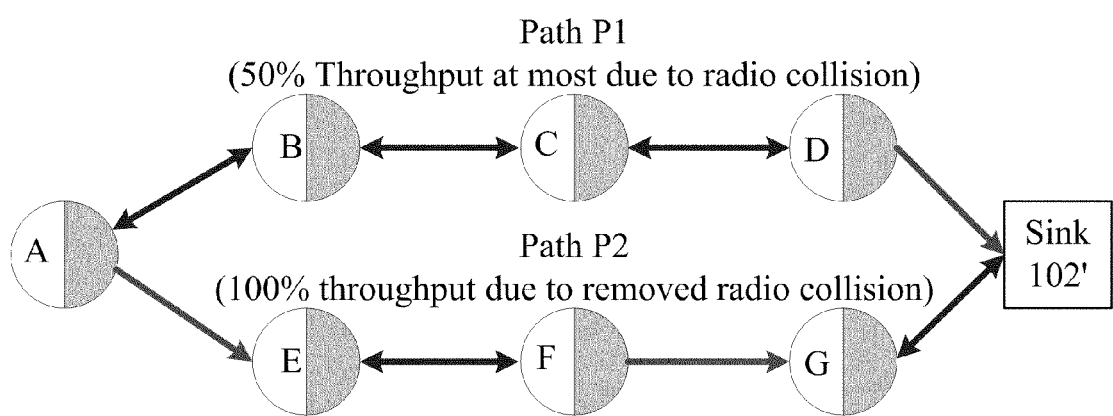
FIG. 7 shows an exemplary routing example for the hybrid communication system of FIG. 1B.

FIG. 7 shows an exemplary routing example for the hybrid communication system of FIG. 1B. In this example, two paths P1 and P2 are available in the network topology. P1 has three pure wireless hops and 1 pure optical hop, while P2 has two pure optical hops and two pure wireless hops. According to the preferred embodiment, P2 is selected and due to the removed radio collision (no two neighboring wireless link) and achieves 100% throughput. However, P1, due to the three neighboring wireless links and resulted radio collision, can obtain 50% throughput at most and is not selected.

The dynamic routing process takes "the number of optical links" and "the number of wireless/RF links" into consideration for path selection. Similarly, the MAC coordination process considers "optical link availability" and "wireless/RF link availability" at neighboring nodes.

The system described herein optimally utilizes optical and wireless link to improve system throughput, reliable, scalability, and energy efficiency and is ideal for applications that require reliable and high-speed data transmissions such as wireless telemedicine and smart home.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, in addition to the previously mentioned optical receiver, transmitter, or transceiver and in addition to the RF receiver, transmitter, or transceiver, the node preferably includes a processor, random access memory (RAM), a program memory (preferably a writable read-only memory (ROM) such as a flash ROM) and an input/output (I/O) controller coupled by a CPU bus. The node may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable node, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for communicating data in an integrated sensor network having one or more nodes coupled to an optical sensor network and a radio frequency wireless sensor network, each node having an optical link and a wireless link, the method comprising:

a. determining a transmission path having one or more hybrid hops for packet transmission over the optical sensor network and the radio frequency wireless sensor network, each hybrid hop including optical and wireless links between two neighboring nodes; and
   b. selecting a set of optical and wireless links for the optical sensor network and the radio frequency wireless sensor network to minimize contiguous wireless links;
   c. coordinating transmissions over the optical sensor network and the radio frequency wireless sensor network with a quality-aware cross-link optimization;
   d. transmitting a packet over both wireless and optical links to improve performance through link diversity; and
   e. automatically switching to a good link if a bad link is detected.

2. The method of claim 1, comprising selecting only optical transmission for a pure optical hop and selecting only wireless transmission a pure wireless hop.

3. The method of claim 1, comprising selecting either the optical link or the wireless link for packet transmission if a hop is the only hop from a source to a destination.

4. The method of claim 1, comprising selecting the optical link if a prior hop uses the wireless link.

5. The method of claim 1, comprising selecting the optical link if a succeeding hop uses the wireless link.

6. The method of claim 1, comprising selecting either the wireless link or the optical link if neither a prior hop nor a succeeding hop uses the wireless link.

7. The method of claim 1, comprising selecting the optical link if a prior hop uses the optical link and a succeeding hop is a hybrid hop.

8. The method of claim 1, comprising checking if a prior or succeeding hop is a hybrid hop if the transmission link of a hybrid hop changes.

9. The method of claim 1, comprising reselecting a link when a hybrid hop changes its transmission link from an optical link to a wireless link.

10. The method of claim 1, comprising reselecting a link when a hybrid hop changes its transmission link from the wireless link to the optical link.

11. The method of claim 1, comprising reselecting a link due to link unavailability and a prior hop or a succeeding hop is a hybrid hop.

12. The method of claim 11, comprising recursively reselecting link for the prior or succeeding hop if they are hybrid hops.

13. The method of claim 1, comprising forming an ad hoc topology including tree, linear, or mesh topology with the nodes.

14. The method of claim 1, comprising communicating with a node having an RF transceiver and an optical transmitter, a node having an RF transceiver and an optical receiver, or a node having an RF transceiver and an optical transceiver.

15. The method of claim 1, comprising determining a transmission path between nodes to minimize contiguous wireless links.

16. The method of claim 1, comprising selecting a path based on optical and wireless link availability and quality information.

17. The method of claim 1, comprising determining a weighted path length, an average optical hops, and a remaining bandwidth determination.

18. The method of claim 1, comprising determining link quality.

19. The method of claim 18, comprising selecting candidates with a remaining bandwidth determination and selecting a path with a maximum average optical hop count.

20. The method of claim 1, comprising transmitting the packet over both an optical media access control (MAC) and a wireless MAC.

* * * * *